US010175849B2

(12) United States Patent
Yamanaka et al.

(10) Patent No.: US 10,175,849 B2
(45) Date of Patent: Jan. 8, 2019

(54) ELECTRONIC DEVICE

(75) Inventors: Yasuhiro Yamanaka, Chiba (JP);
Kaoru Morishita, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 211 days.

(21) Appl. No.: 13/546,309

(22) Filed: Jul. 11, 2012

(65) Prior Publication Data

US 2013/0038637 A1    Feb. 14, 2013

(30) Foreign Application Priority Data

Aug. 12, 2011    (JP) .................................. 2011-177012

(51) Int. Cl.
*G06F 3/0482* (2013.01)
*G06F 3/0485* (2013.01)
*G06F 3/0481* (2013.01)
*G06Q 30/06* (2012.01)

(52) U.S. Cl.
CPC .......... *G06F 3/0482* (2013.01); *G06F 3/0481* (2013.01); *G06F 3/0485* (2013.01); *G06Q 30/0643* (2013.01)

(58) Field of Classification Search
CPC .... G06F 3/0482; G06F 3/0485; G06F 3/0481; G06Q 30/0643
See application file for complete search history.

(56) References Cited

U.S. PATENT DOCUMENTS 6,216,141 B1 *   4/2001   Straub et al. ................. 715/234
7,694,233 B1 *   4/2010   Ording .................. G06F 3/0481
                                                           715/788

| | | |
|---|---|---|
| 2002/0112018 A1 | 8/2002 | Kaminagayoshi |
| 2006/0150117 A1* | 7/2006 | Fujita ............................ 715/788 |
| 2006/0184966 A1 | 8/2006 | Hunleth et al. |
| 2007/0239566 A1 | 10/2007 | Dunnahoo et al. |
| 2009/0172598 A1* | 7/2009 | Yamanaka et al. .......... 715/841 |
| 2010/0031193 A1 | 2/2010 | Stark et al. |

(Continued)

FOREIGN PATENT DOCUMENTS

| | | |
|---|---|---|
| CN | 1749941 | 3/2006 |
| CN | 1759371 | 4/2006 |

(Continued)

OTHER PUBLICATIONS

Author: PSM3, Title: PS3 Menu Exploration, Date: Oct. 25, 2006, pp. 1-15 of screenshots from the video source: https://www.youtube.com/watch?v=hCPOob3Bya4.*

(Continued)

*Primary Examiner* — Jwalant Amin

(74) *Attorney, Agent, or Firm* — Katten Muchin Rosenman LLP

(57) ABSTRACT

An acquisition unit acquires list data concerning contents and records the acquired list data in a recording medium. A list display unit arranges a plurality of content images adjacent to each other and places them on a screen. As a receiving unit acquires an instruction to select one of the content images in a content list, the list display causes a display of the content list including a selected content image, in a first area of the screen and, at the same time, causes a display of detailed information associated with the selected content image, in a second area of the screen.

6 Claims, 16 Drawing Sheets

(56) References Cited

U.S. PATENT DOCUMENTS

| | | | |
|---|---|---|---|
| 2010/0083181 A1 | 4/2010 | Matsushima et al. | |
| 2010/0095238 A1 | 4/2010 | Baudet | |
| 2010/0199219 A1* | 8/2010 | Poniatowski | G06F 3/0482 715/825 |
| 2010/0248788 A1* | 9/2010 | Yook et al. | 455/566 |
| 2011/0055763 A1* | 3/2011 | Utsuki et al. | 715/835 |
| 2011/0179453 A1* | 7/2011 | Poniatowski | G06F 3/0482 725/58 |
| 2012/0158465 A1* | 6/2012 | Golembiewski | 705/7.42 |
| 2012/0311632 A1* | 12/2012 | Hill | H04N 21/4622 725/40 |
| 2014/0250381 A1* | 9/2014 | Stallings, Jr. | H04L 12/4625 715/716 |

FOREIGN PATENT DOCUMENTS

| | | | |
|---|---|---|---|
| CN | 102004603 | | 4/2011 |
| JP | 8-275076 | | 10/1996 |
| JP | 2003-330587 | | 11/2003 |
| JP | 2005-045745 | | 2/2005 |
| JP | 2006-107424 | * 4/2006 | G06F 3/048 |
| JP | 2006-163647 | | 6/2006 |
| JP | 2006-268295 | | 10/2006 |
| JP | 2008-191728 | | 8/2008 |
| JP | 2008-191779 | | 8/2008 |
| JP | 2008-217338 | | 9/2008 |
| JP | 2009-163366 | | 7/2009 |
| JP | 2009-219163 | | 9/2009 |
| JP | 2009-303143 | | 12/2009 |
| JP | 2010-113420 | | 5/2010 |
| JP | 2011-53790 | | 3/2011 |
| WO | 2007/037264 | | 4/2007 |

OTHER PUBLICATIONS

Author: Tech on the Net; Title: "Excel: Update a cell when a checkbox is clicked (Forms toolbar) in Excel 2003/XP/2000/97", Mar. 21, 2009, source: http://web.archive.org/web/20090321233505/http://www.techonthenet.com/excel/macros/checkbox.php.*

Notification of Reason(s) for Refusal dated Jun. 11, 2013, from corresponding Japanese Application No. 2011-177012.

Decision of Refusal dated Jan. 28, 2014, from corresponding Japanese Application No. 2011-177012.

Notification of Reason(s) for Refusal dated Sep. 17, 2013, from corresponding Japanese Application No. 2011-177012.

Japanese Notification of Reason for Refusal dated Mar. 31, 2015 from corresponding Application No. 2011-177012.

Chinese First Office Action dated Mar. 6, 2015 from corresponding Application No. 2012-102851625.

Japanese Notification of Reason for Refusal dated Aug. 4, 2015 from corresponding Application No. 2014-083587.

European Search Report dated Feb. 3, 2016 from corresponding Application No. 12177334.5.

Japanese Decision of Refusal dated Feb. 4, 2016 from corresponding Application No. 2014-083587.

* cited by examiner

ELECTRONIC DEVICE

BACKGROUND OF THE INVENTION

1. Field of the Invention

The present invention relates to an electronic device, and more particularly, to an electronic device having a display processing function.

2. Description of the Related Art

Electronic devices, such as mobile game devices and personal digital assistants (PDAs), have been in wide-spread use. And recent years have seen an emergence of multifunctional electronic devices, such as smartphones that combine functions of a mobile phone, PDA, and the like into one. These electronic devices, carrying large-capacity memories and high-speed processors, allow the users' accesses to a great variety of applications by downloading game software, movie, and other contents.

Electronic devices having a touch panel provide an excellent user interface that permits intuitive responses or operations by a user. Such user interfaces now in practical use include one that allows the selection of an icon with a finger tapping on a displayed content image (icon) or one that effects a scrolling of a displayed image with a finger tracing along the panel surface.

RELATED ART LIST (1) United State Patent Application Publication No. US 2002/0112018 A1 (Publication Date: Aug., 15, 2002)

Many of the electronic devices of recent years are equipped with wireless communication functions and large-capacity memory such that they are capable of downloading various contents into the memory by accessing external content distribution servers. And since those content distribution servers have vast numbers of contents to offer, it is desired that the electronic devices provide the users with interfaces that allow easier selection of such contents.

Also, especially with a mobile electronic device, it is desired that content is downloaded in the background, thereby allowing the user to perform a search for another content or like action while the downloading is going on. This may, however, pose a problem that the user cannot readily see the progress of the downloading that is being done in the background. Therefore, it is preferable if the user can get information concerning the downloading in progress in the background and can be led to access the information efficiently.

SUMMARY OF THE INVENTION

A purpose of the present invention is therefore to provided an interface that facilitates the user selection of content. Another purpose thereof is to provide information about downloading effectively to the user.

In order to resolve the aforementioned problems, an electronic device according to one embodiment of the present invention includes: an acquisition unit configured to acquire data of an item of content; and a display control unit configured to generate an image displayed on a display. The display control unit includes: a display processing unit configured to place a plurality of items adjacent to each other; and a receiving unit configured to acquire a selection instruction by which to select an item from among the items that are placed adjacent to each other. When the receiving unit acquires the selection instruction, the display processing unit places the plurality of items, including the selected item, adjacent to each other so as to be displayed and simultaneously displays an item associated with the selected item.

Optional combinations of the aforementioned constituting elements, and implementations of the invention in the form of methods, apparatuses, systems, recording media, computer programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
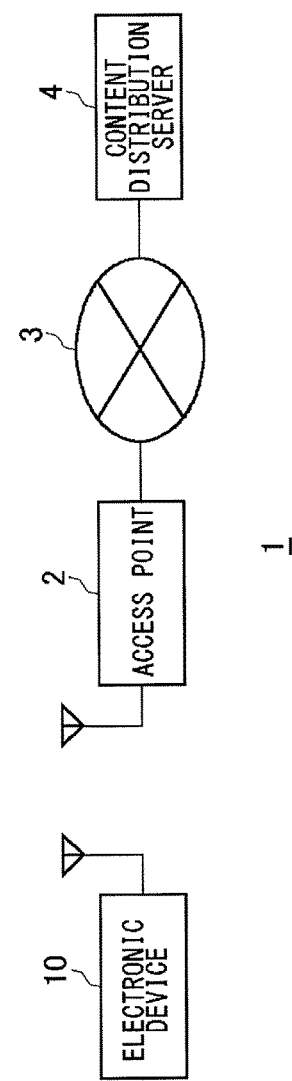
FIG. 1 illustrates a structure of a content providing system according to an exemplary embodiment.

FIG. 1 illustrates a structure of a content providing system 1 according to an exemplary embodiment of the present invention. In the content providing system 1, an electronic device 10 and a content distribution server 4 are connected in a manner that permits communication via a network 3 such as the Internet. The electronic device 10 sends a request for the acquisition of list data and a request for the downloading of a content file to the content distribution server 4. Also, the content distribution server 4 sends the list data, the content file and the like to the electronic device 10. The content distribution server 4 may be constituted by a plurality of servers. The list data contains content images and detailed information on contents and so forth, corresponding respectively to a plurality of contents. The content image, which may be a package image of the content, is configured as an icon image. The detailed content information may contain a content itself, evaluation comments from other users, and the like. The electronic device 10, which is equipped with a wireless communication function, is connected to the network 3 via an access point 2.

The electronic device 10 according to the present exemplary embodiment has a communication function using a wireless LAN (Local Area Network) scheme but may have other wireless communication schemes such as a mobile telephone scheme. Also, the electronic device 10 may be configured such that the electronic device 10 communicates with the content distribution server 4 by connecting it to an external device via a wired cable such as a USB cable.

The access point 2 functions as a relay unit that connects the electronic device 10 to another access point by wireless LAN or connects the electronic device 10 to the network 3 such as the Internet and wired LAN. If the electronic device 10 has a wired communication function, the electronic device 10 can be connected to the content distribution server 4 by the use of a personal computer (PC), for instance, connected to the network 3 as the relay unit. The electronic device 10 may be a mobile phone, a personal digital assistant (PDA) or a mobile game device, for instance. In the content providing system 1, the electronic device 10 is equipped with an application that is used to download contents by accessing the content distribution server 4. This download application has a function of displaying a content list and the like so as to support the user when he/she purchases a content. Taken as an example in the following is a case where the electronic device 10 is a mobile game device equipped with a download application.

Figure 2:
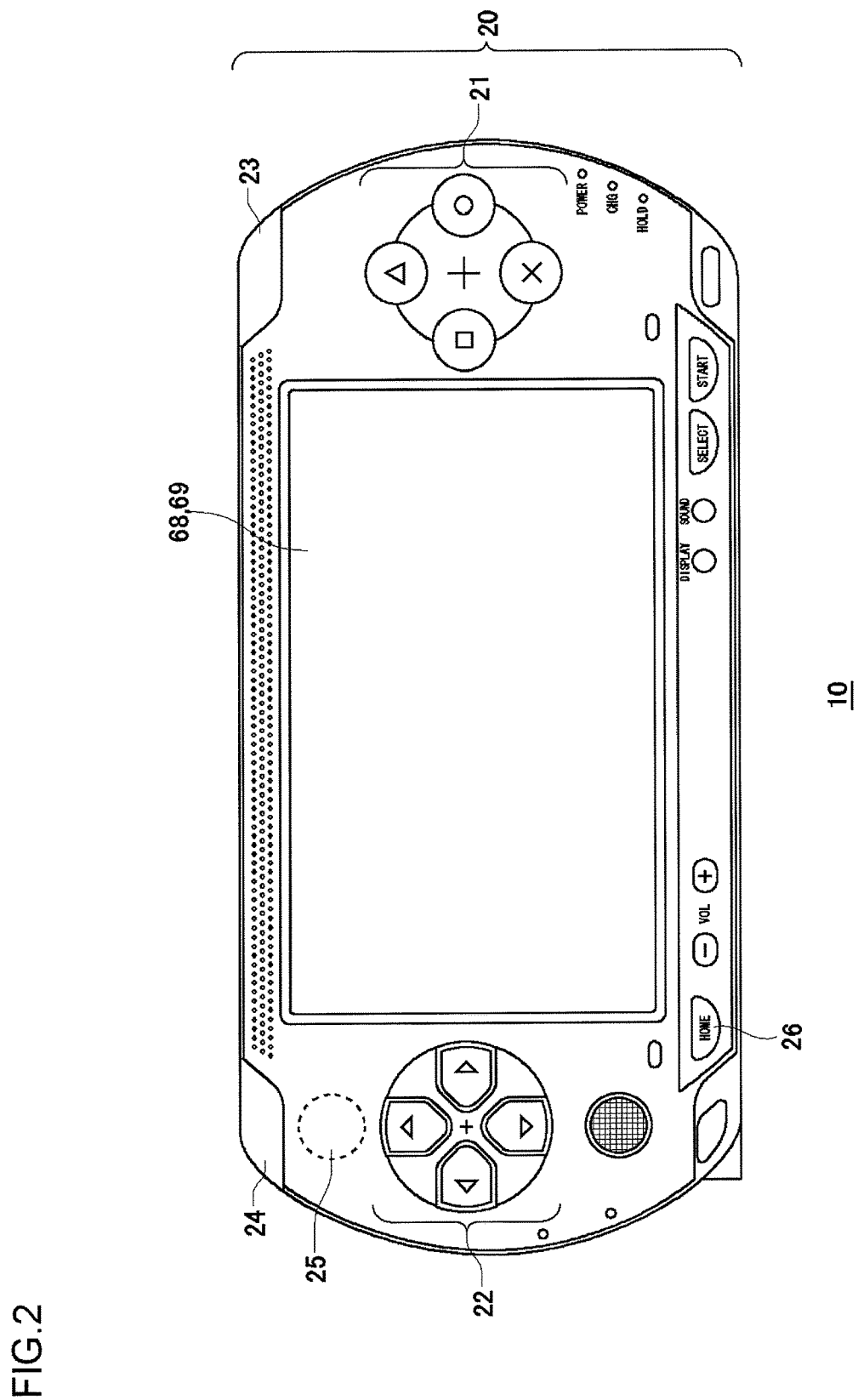
FIG. 2 illustrates an example of the appearance of an electronic device according to an exemplary embodiment of the present invention.

FIG. 2 illustrates an example of the appearance of an electronic device 10 according to an exemplary embodiment of the present invention. Input devices 20, such as instruction input buttons 21, direction keys 22, an R button 23, an L button 24, and a HOME button 26, and a display device 68 are provided on the upper side of the electronic device 10, which is the side thereof facing the user who holds and operates it. The display device 68 is of display size that it has a horizontally long shape, and the electronic device 10 is held by the user on one side or both sides. The display device 68 is provided with a touch panel 69 that detects contact by a finger of the user, a stylus pen or the like. Provided inside the electronic device 10 is a motion sensor 25 capable of detecting the inclination of the electronic device 10. It should be noted also that the electronic device 10 may be provided with a back touch panel on the back side thereof.

Provided in a lateral side of the electronic device 10 is a slot (not shown) for receiving a recording medium like a memory card. Also provided in a lateral side of the information processing apparatus 10 is a slot (not shown) for receiving a cartridge that has a game file recorded thereon.

The user, while holding the horizontally-long electronic device 10 with both hands, can operate the instruction input buttons 21 with the thumb of the right hand, the direction keys 22 with the thumb of the left hand, the R button 23 with the index finger or the middle finger of the right hand, and the L button 24 with the index finger or the middle finger of the left hand, for instance. Also, when operating the touch panel 69, the user may hold the electronic device 10 with both hands and operate the touch panel 69 with the thumbs of both hands, or may hold the electronic device 10 with the left hand and operate the touch panel 69 with the right hand.

Figure 3:
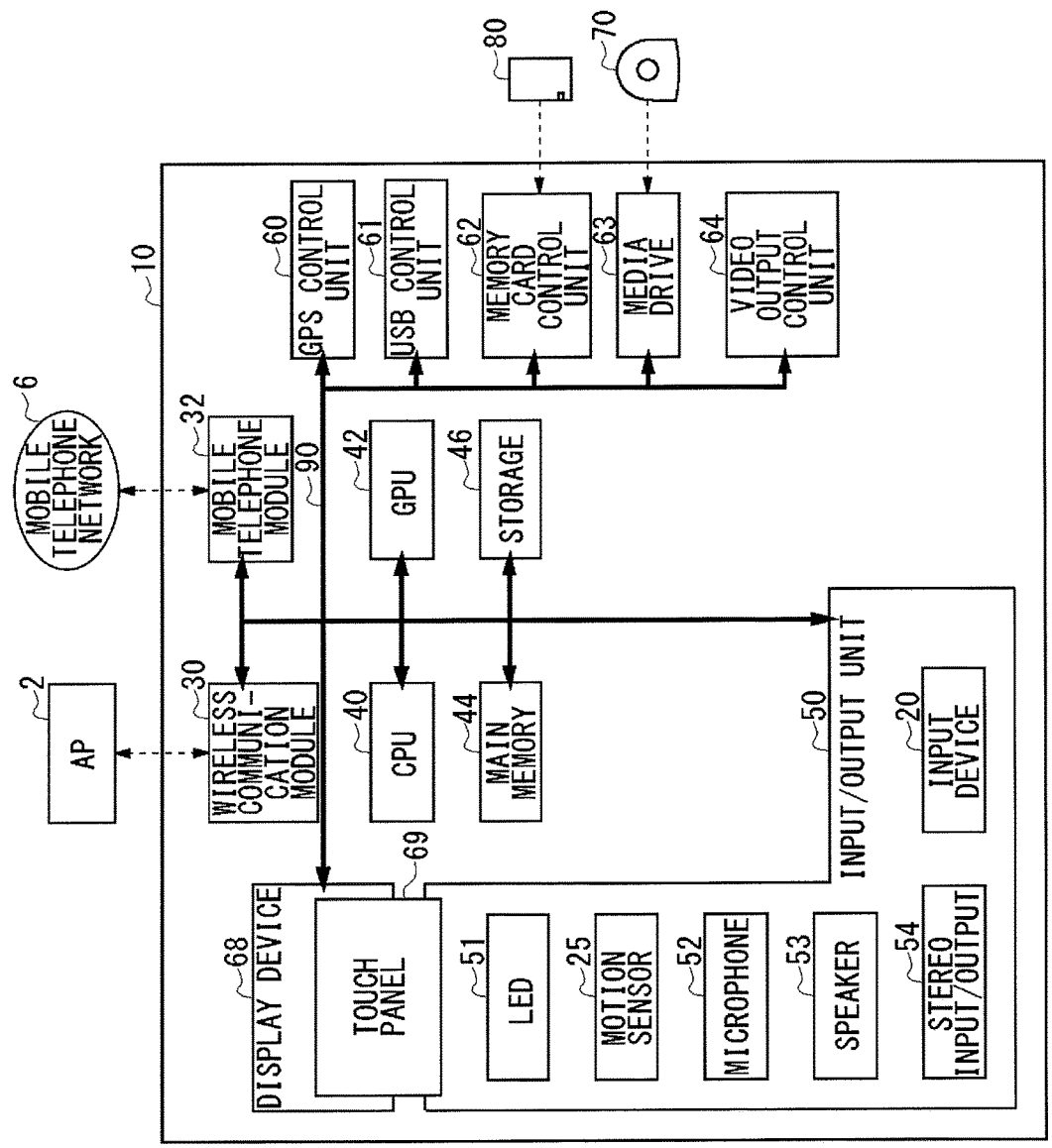
FIG. 3 illustrates functional blocks of an electronic device.

FIG. 3 illustrates functional blocks of the electronic device 10. The display device 68 displays images generated by the respective functions of the electronic device 10. The display device 68 may be a liquid crystal display device or an organic EL display device. The touch panel 69 is so provided as to be superimposed on the display device 68, and detects the touch or contact of a user's finger, pen or the like. The touch panel 69 may implement any of a resistive overlay method, a surface electrostatic capacitive method, a projected electrostatic capacitive method, and the like. In the electronic device 10, the display is comprised of the display device 68 and the touch panel 69.

A wireless communication module 30 is constituted by a wireless LAN module compliant with a communication standard such as IEEE 802.11b/g, and connects to the network 3 via the access point (AP) 2. A mobile telephone module 32 is compatible with a third-generation digital mobile telephone scheme compliant with the international mobile telecommunication 2000 (IMT-2000) standard prescribed by the International Telecommunication Union (ITU), and the mobile telephone module 32 connects to a mobile telephone network 6. A subscriber identity module (SIM) card, in which a unique ID number to identify a telephone number of a mobile telephone has been recorded, is inserted to the mobile telephone module 32.

In an input/output unit 50, an LED (Light Emitting Diode) 51 blinks while the wireless communication module 30, the mobile telephone module 32, and the like transmit and receive data. A motion sensor 25 detects the movement of the electronic device 10. A microphone 52 inputs sound surrounding the electronic device 10. A speaker 53 outputs audio generated by the respective functions of the electronic device 10. A stereo input/output terminal 54 receives the input of stereo audio from an external microphone, and outputs the stereo audio to an external headphone or the like. An input device 20 includes operation keys and the like and receives the input of a user's operation.

A CPU (central processing unit) 40 executes programs and the like loaded in main memory 44 and, in the present exemplary embodiment, the CPU 40 executes the download application. A GPU (Graphics Processing Unit) 42 performs computations necessary for the image processing. The main memory 44 is comprised of RAM (Random Access Memory) and the like, and stores programs, data, and so forth that run and operate in the electronic device 10. A storage 46 is comprised of NAND-type flash memory and the like, and is used as a built-in type auxiliary storage device.

A GPS (Global Positioning System) control unit 60 receives signals from GPS satellites and computes the present position. A USB control unit 61 controls communications between peripheral devices connected via USBs (Universal Serial Buses). A video output control unit 64 outputs video signals to an external display device, based on a standard such as HDMI (High Definition Multimedia Interface). A memory card control unit 62 controls read and write of data between recording media 80 such as flash memories and the like inserted into the slot (not shown). As the removable recording medium 80 is inserted into the slot, the recording medium 80 is used as an external auxiliary storage device. A media drive 63 is a receiving section in which a game cartridge 70 that has recorded game files is loaded, and the media drive 63 controls read and write of data between the game cartridge 70 and the electronic device 10.

In the content providing system 1 according to the present exemplary embodiment, the content distribution server 4 stores content data that is fee-based or offered for free. The content distribution server 4 is a so-called on-line shop and offers contents such as game files, video files and the like. As the electronic device 10 accesses the content providing server 4, a list of contents are displayed on the display device 68 and then the content data is downloaded from the content distribution server 4 when the user selects a content from the list thereof. A description is given hereunder of a specific structure of the electronic device 10.

Figure 4:
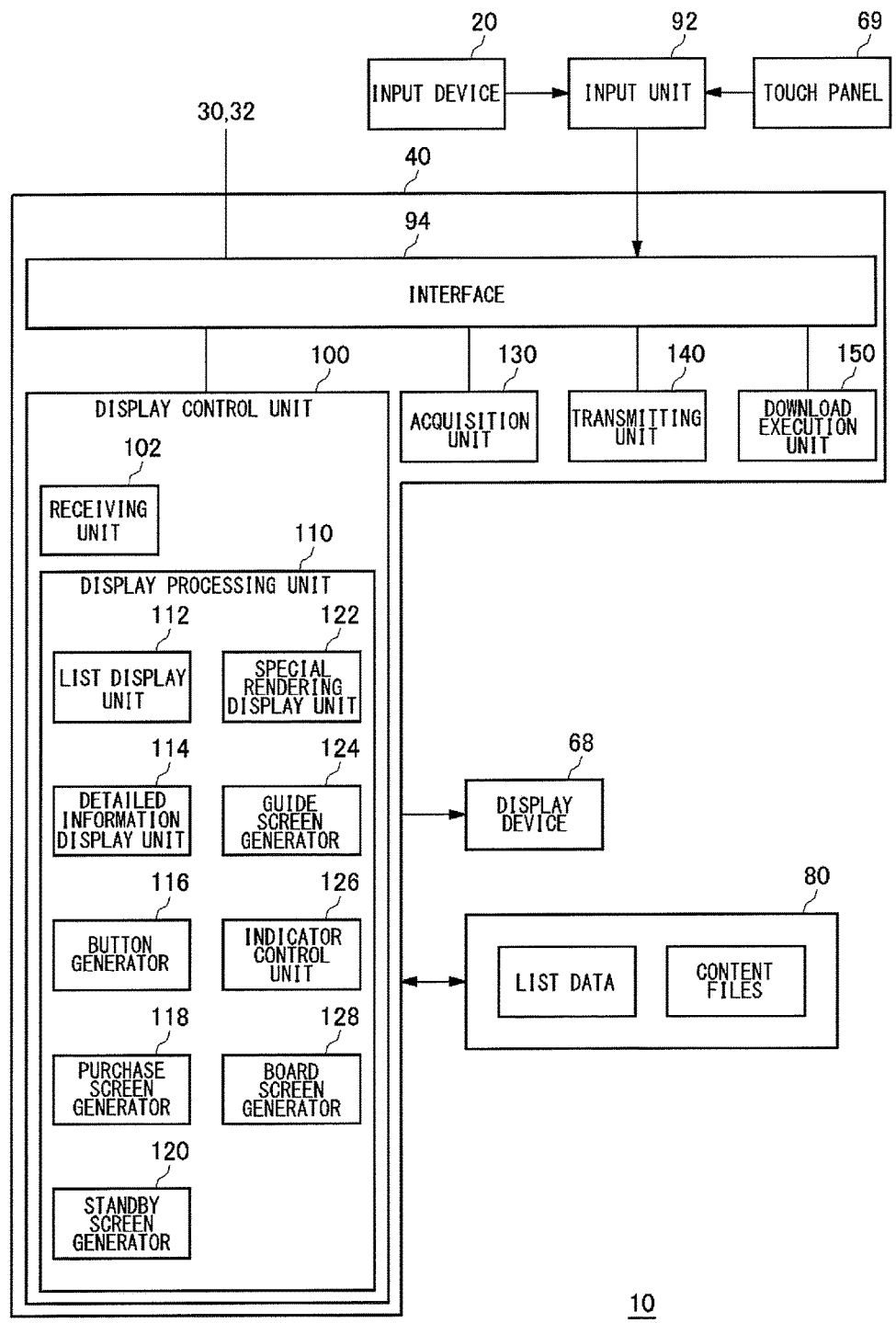
FIG. 4 illustrates functional blocks for executing a content display function and a download function.

FIG. 4 illustrates functional blocks for executing a content display function and a download function in the electronic device 10. The main memory 44, the GPU 42 and so forth are omitted in FIG. 4. The electronic device 10 includes an input device 20, a touch panel 69, an input unit 92, a CPU 40, a recording medium 80, and a display device 68.

The CPU 40 executes the functions of an interface 94, a display control unit 100, an acquisition unit 130, a transmitting unit 140, and a download execution unit 150. These respective functions are realized by the download application according to the present exemplary embodiment. The acquisition unit 130 has a function of acquiring data of a displayed item relating to the content (a "displayed item" will be hereinafter simply referred to as "item" also). The display control unit 100, which has a function of generating images displayed on a display, includes a receiving unit 102 and a display processing unit 110. The display processing unit 110 has a function of placing a plurality of items side by side or adjacent to each other and arranging them on the display. The display processing unit 110 includes a list display unit 112, a detailed information display unit 114, a button generator 116, a purchase screen generator 118, a standby screen generator 120, a special rendering display unit 122, a guide screen generator 124, an indicator control unit 126, and a board screen generator 128.

Hence, each of these elements described in conjunction with FIG. 3 and FIG. 4 as a functional block for performing various processings may be implemented hardwarewise by a CPU, memory, and other LSIs, and softwarewise by memory-loaded programs or the like. Therefore, it is understood by those skilled in the art that the functional blocks may be implemented by a variety of manners including hardware only, software only or a combination of both, and are not limited to any particular one.

The input unit 92 receives a user's operation inputted from the input device 20 and the touch panel 69. Although shown below is an example where the input unit 92 receives input operations when the user operates on the touch panel 69 with his/her finger, the input operation may be generated through the operation buttons in the input device 20. Hereinafter, a "tap" operation is an operation where the user slightly presses or hits a screen with a finger. As the input unit 92 supplies an input position in the screen to the CPU 40, the CPU 40 receives the processing associated with a tapped region, as an instruction to be carried out. A "slide" or "sliding" operation is an action where the user slides his/her finger on the screen. As the input unit 92 supplies a position, where the user has slid his/her finger on the screen, to the CPU 40, the CPU 40 receives this as an instruction to scroll a plurality of items arranged side by side or adjacent to each other.

The recording medium 80 records data that the download application uses. Note that other recording devices such as the storage 46 may be used in substitution for the recording medium 80.

A description is given hereunder of a procedure in which a content file is downloaded when the electronic device 10 access the content distribution server 4. A menu screen is displayed on the display device 68 at power-on of the electronic device 10 or when the user instructs the displaying of a menu. Icon images of executable applications are arranged on the menu screen.

Figure 5:
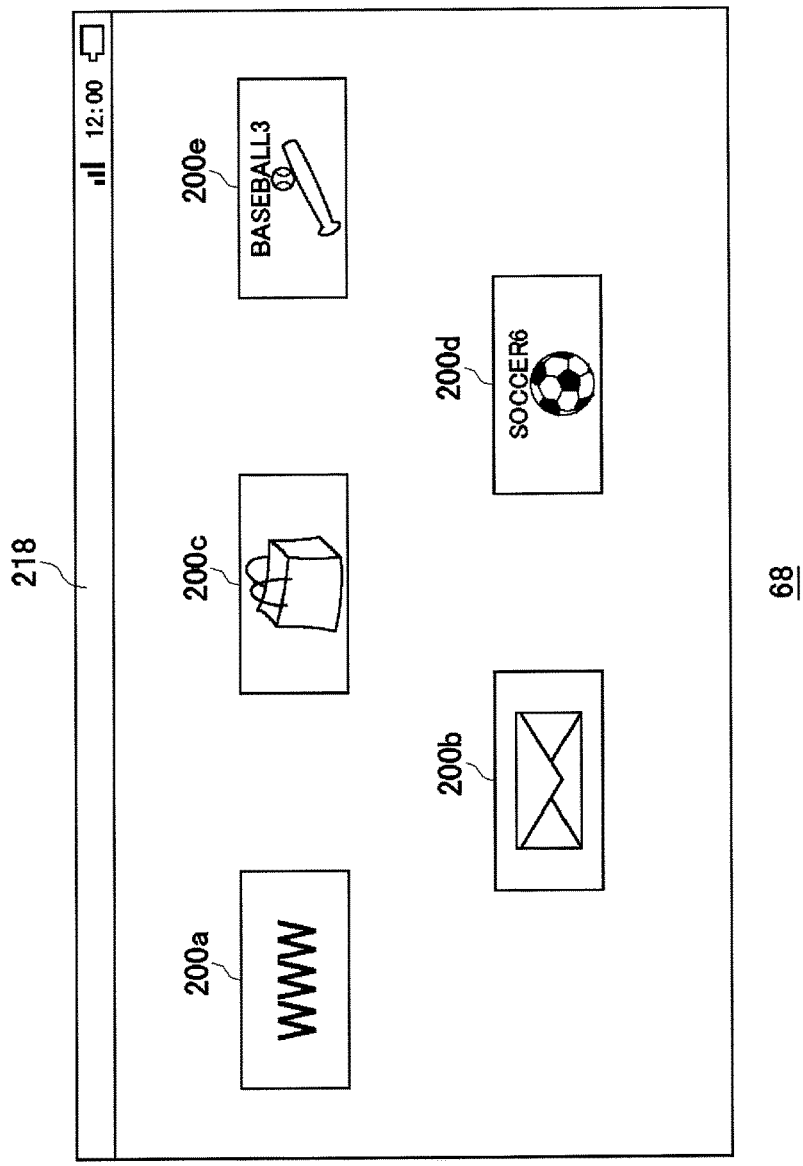
FIG. 5 illustrates an example of a menu screen displayed on a display device.

FIG. 5 illustrates an example of a menu screen displayed on the display device 68. An information bar 218 is located in the uppermost part of the menu screen. Displayed in the information bar 218 may be information concerning battery state, communication environment, and the like. Arranged on the screen below the information bar 218 are icon images 200*a* to 200*e* of executable applications. Each icon image 200 is associated with an applicable application. Thus, with an icon image 200 selected by the user on the menu screen, an environment will be created for the execution of an application specified by the icon image 200.

For example, the icon image 200*a* specifies a Web connection application, the icon image 200*b* an e-mail application, and the icon image 200*c* an application by which to download a content file by accessing an on-line shop. Also, the icon images 200*d* and 200*e* may specify their respective game titles.

The user selects an icon image 200 by tapping the icon image 200 on the menu screen. The tapped position is detected by the touch panel 69 and is communicated by the input unit 92 to the CPU 40. The arrangement may also be such that when the user has performed a predetermined decision operation with the move of a cursor on the menu screen by operating the input device 20, the input unit 92 receives the selection of an icon image 200 specified by the Cursor.

In the present exemplary embodiment, an application specified by an icon image 200 is not started immediately after the icon image 200 on the menu screen is selected, but a display screen related to the application is first generated and displayed on the display device 68. Hereinafter, this display screen will be referred to as "board screen". Discussed for this exemplary embodiment is an example of the electronic device 10 connecting to the content distribution server 4 of on-line shops with the user selecting the icon image 200*c*.

Figure 6:
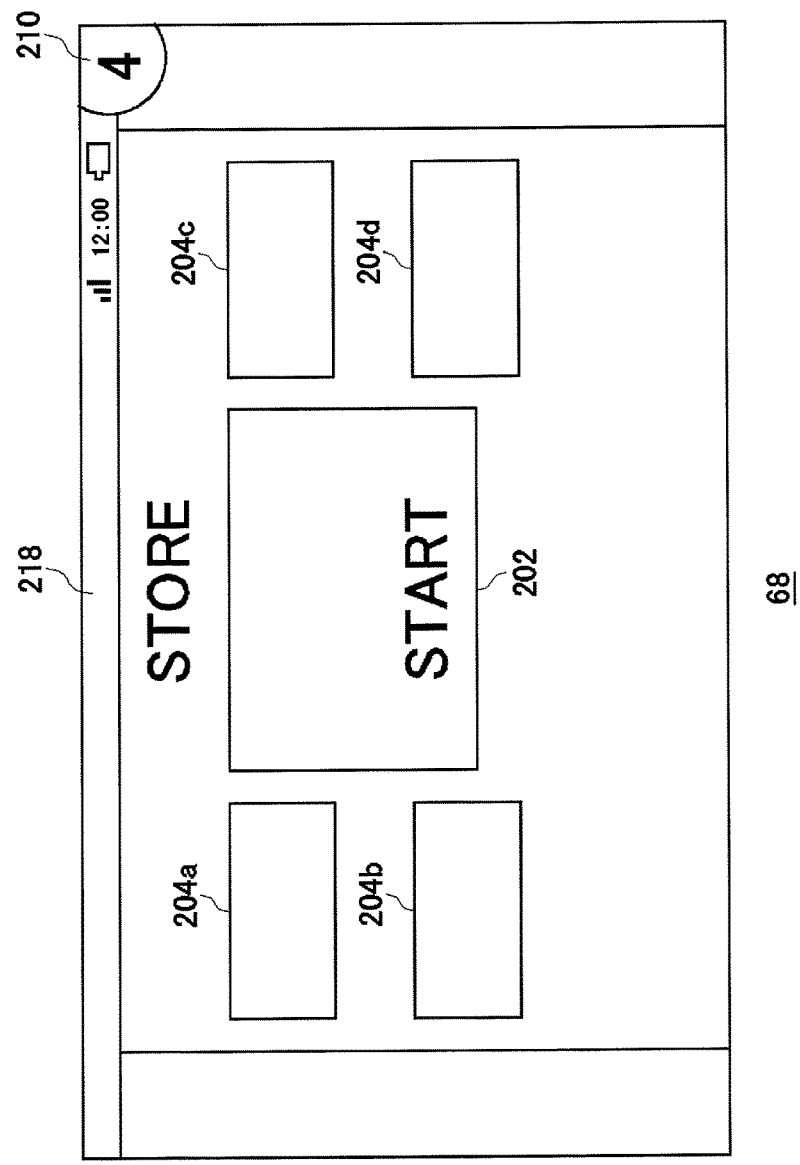
FIG. 6 illustrates an example of a board screen.

FIG. 6 illustrates an example of a board screen. The board screen generator 128 generates a board screen corresponding to the icon image 200*c* selected on the menu screen. A start button 202 is positioned in the middle of the board screen, and various related information or messages 204*a* to 204*d* are placed around the start button 202. The related information 204 may be notices sent from the content distribution server 4. The electronic device 10 may obtain the latest related information 204 from the content distribution server 4 in advance or at the time of displaying the board screen.

In the upper-right corner of the display device 68, an indicator 210 is formed overlapping a part of the information bar 218. Within the electronic device 10, status changes detected by various applications are conveyed to the indicator control unit 126. Upon receipt of the information, the indicator control unit 126 counts the number of the applications conveying the status changes and has the counted value displayed in a display area of the indicator 210. For example, if the mail application receives a newly-arriving e-mail, the information will be conveyed to the indicator control unit 126, and the indicator control unit 126 will add one to the count. Also, if the download application notifies the indicator control unit 126 of a completion of downloading, the indicator control unit 126 will add one to the count. In the example shown in FIG. 6, the number "4" is being displayed in the display area of the indicator 210, which means that notifications of status changes have been received from four different applications. At this point, with the indicator 210 tapped by the user, the indicator control unit 126 will have a notification screen of status changes of applications displayed.

As will be discussed later, while the electronic device 10 is downloading a content file, the user is informed of the progress of the downloading by a show of some pattern or marking rotating in the indicator 210. The download application does not detect the progress of downloading as a status change although the download application does detect the completion of downloading as a status change. Therefore, even when the download application has started downloading, there is no change in the numeral shown in the display area of the indicator 210, and the numeral will be incremented by one upon the completion of the downloading. With a tap on the indicator 210 by the user during a downloading, a progress check screen of the downloading will be displayed. Note that if the user taps the indicator 210 after the completion of downloading, then the status of the completed downloading will be displayed as an update information on the status change notification screen. The notification screen of status changes and the progress check screen of downloading may be displayed respectively by a selection of their tabs provided on the upper side of the screen.

With a tap on the start button 202 by the user, the download application will start. The download application provides an interface that allows easy selection of a content by the user by presenting an efficient display of contents.

Figure 7:
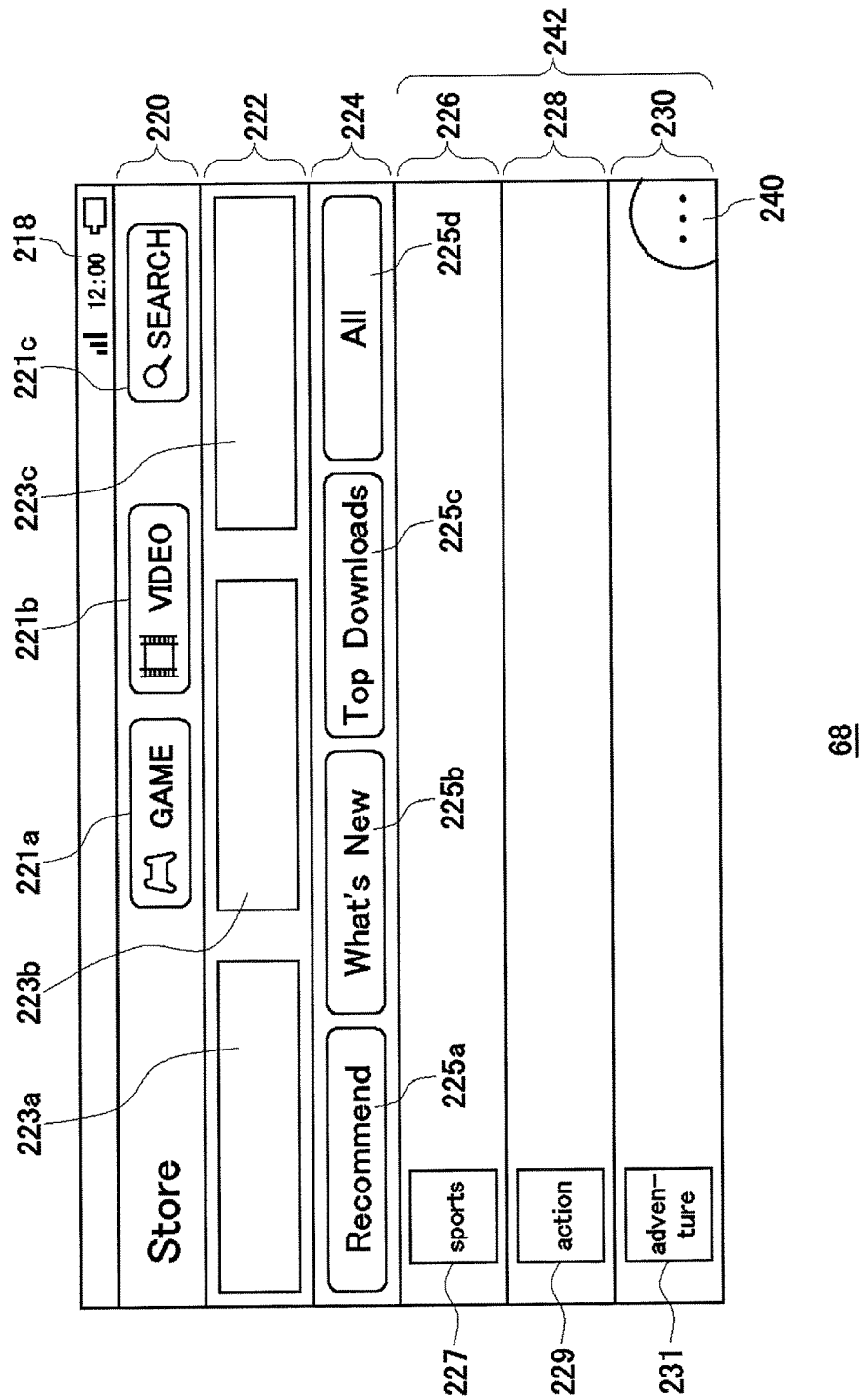
FIG. 7 illustrates a top screen of a content presentation screen.

FIG. 7 illustrates a top screen of a content presentation screen. The top screen is formed by including a plurality of display areas into which the screen is divided along the vertical direction of the screen. In this example, below the information bar 218 formed in an upper portion of a display there are formed a tab display area 220, a content display area 222, a tab display area 224, and category display areas 226, 228 and 230 in this order from top. A graphical user interface (GUI) is formed in each of these display areas, and a processing associated with a selected GUI is executed when the user taps on the selected GUI.

In the tab display area 220, there are provided a tab 221a for presenting a game content, a tab 221b for presenting a video content, and a search button 221c. Either one of the tab 221a for games and the tab 221b for videos is selected, and the presentation screen for the selected content is formed. On the top screen, the tab 221a is selected by default. In the example shown in FIG. 7, the game tab 221a is selected and a presentation screen for a game content is displayed. It is to be appreciated that the presentation screen for a game or video selected on the top screen when the download application is terminated last time may be displayed at the time of startup of the top screen this time. With a tap on the search button 221c, a search window is formed.

With a tap on either the tab 221a or the tab 221b in the tab display area 220, the display below the tab display area 220 will be switched. As, for example, the tab 221b is selected on the top screen shown in FIG. 7, the display below the tab display area 220 is switched to the screen for presenting a video content.

Figure 10:
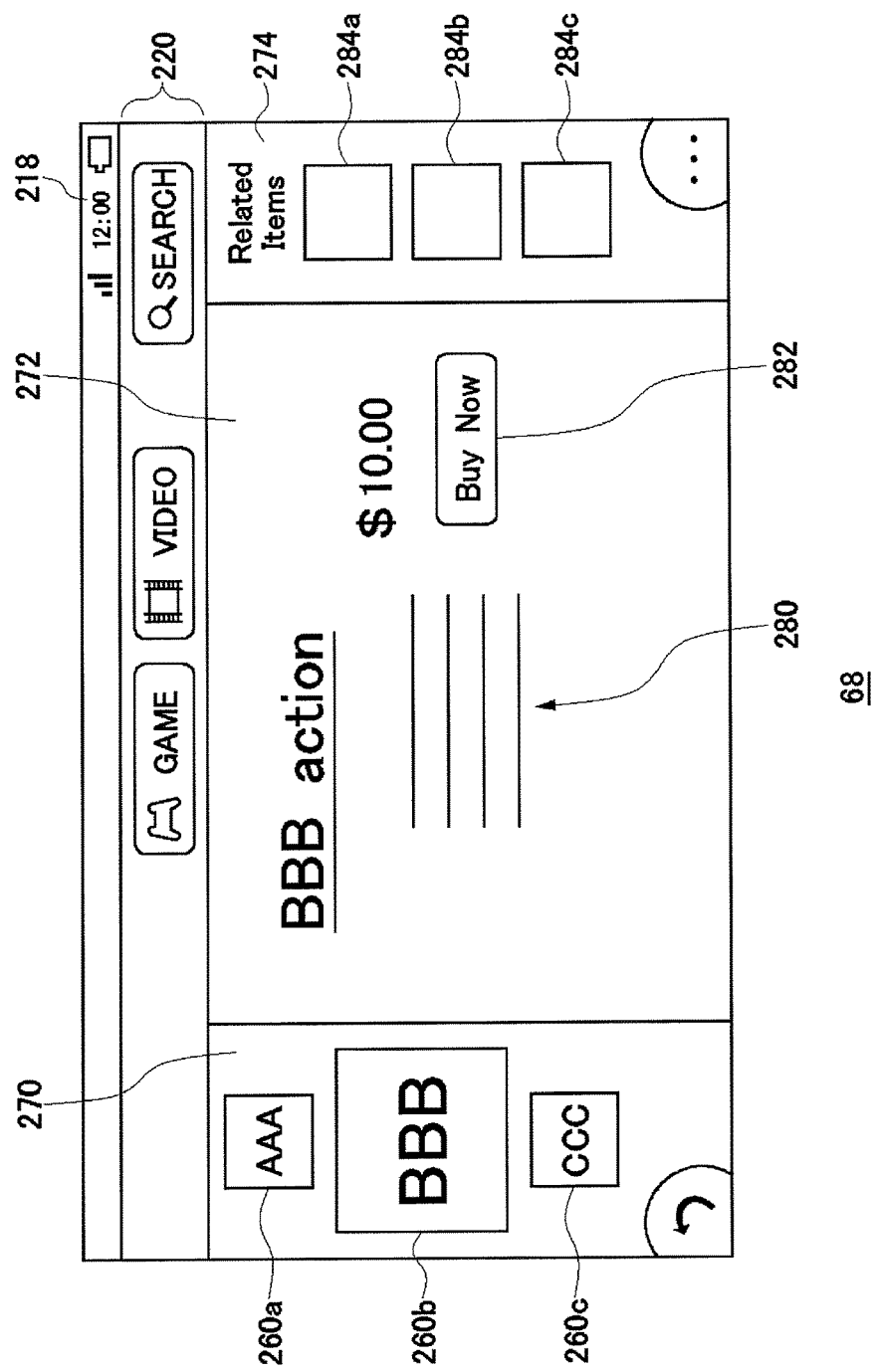
FIG. 10 illustrates a display screen of detailed information on a content.

A plurality of content images 223a, 223b, 223c are displayed in the content display area 222. As the user places his/her finger on the content display area 222 and slides the finger to the right or left, a content image is scrolled in a direction that the finger is slid. The content images 223 displayed in the content display area 222 are determined arbitrarily by an operator of the content distribution server 4. Normally, content images 223 especially recommended for the users are often placed as those in the content display area 222. With a tap on a predetermined content image 223 by the user, the screen will transit to the screen as shown in FIG. 10 where the detailed information concerning the content is presented.

A plurality of tabs 225a, 225b, 225c and 225d are provided in the tab display area 224. The tab 225a is an index GUI for displaying a list of recommended contents, the tab 225b is an index GUI for displaying a list of new contents, the tab 225c is an index GUI for displaying a list of contents sorted in order of popularity, and the tab 225d is an index GUI for displaying all lists of contents. With a tap on any one of the tabs 225, the entire display below the tab display area 224 is switched and a content list corresponding to the tapped tab 225 will be displayed. It is appreciated that a category list may be associated with each of the tabs 225; for example, when the tab 225a is selected, a category list that has extracted recommended contents may be displayed.

A category image 227 by which to select a category of sport games is displayed in the category display area 226. A category image 229 by which to select a category of action games is displayed in the category display area 228. A category image 231 by which to select a category of adventure games is displayed in the category display area 230. The category images 227, 229 and 231 are icon images that represent their game categories, and the categories may be described in plain text form as shown in FIG. 7 or expressed by pictures or figures. Also, although a category image is shown in each of the category areas, explanatory information regarding each category may be placed to the right of the category image. With a tap on any one of the category display areas 226, 228 and 230, a content list associated with the tapped category will be displayed.

Referring to FIG. 4, as the user taps on the start button 202 (see FIG. 6), the acquisition unit 130 acquires data on item or items associated with the content from the content distribution server 4. The data on item or items associated with the content contains list data by which to generate a display list. And the list data contains list information, a category image to identify a category, a content image to identify a content, detailed content information indicating the content itself, link information, and so forth. The list information, which contains information with which to identify a plurality of items to be displayed as a list and the sorting order of the plurality of items, is prepared per category or content. The link information indicates storage locations of category images, content images, detailed content information and the like in the recording medium 80. The information with which to identify the items contained in the list information may be set by the link information. The acquisition unit 130 records the acquired list data in the recording medium 80 according to the link information.

Based on the list data recorded in the recording medium 80, the list display unit 112 places a plurality of items adjacent to each other, on the top screen of the content presentation screen shown in FIG. 7. On the top screen, the tab display area 220 is formed below the information bar 218, and the list display unit 112 arranges a plurality of content images 223a, 223b and 223c contained in the content list side by side in the content display area 222 located below the tab display area 220. Also, the tab display area 224 is formed below the content display area 222, and the list display unit 112 places the category images 227, 229 and 231 vertically next to each other below the tab display area 224.

The button generator 116 generates an option button 240 in a lower-right corner of the display. The option button 240 is a GUI used to display an option menu; with a tap on the option button 240 by the user, a menu such as a transaction history or download list will be displayed. The option button 240 is constantly displayed at the lower-right corner.

As shown in FIG. 7, on the top screen, the category list where a plurality of category images are placed adjacent to each other is displayed below the tab display area 224. The category list is formed in a manner such that a plurality of category images 227, 229 and 231 are arranged vertically across the screen, and the category display areas 226, 228 and 230 form a category list display area 242. The electronic device 10 according to the present exemplary embodiment is a mobile terminal apparatus and thus the display size of the display device 68 is not large. Accordingly, as shown in FIG. 7, the number of category images contained in the category list is limited to three, for instance.

As the user places his/her finger on the list display area 242 and slides it upward in the electronic device 10 according to the exemplary embodiment, the category list is scrolled upward and simultaneously the list display area 242 is enlarged. As the user performs an upward sliding action in the list display area 242, the receiving unit 102 receives this action as a scroll instruction. Based on the scroll instruction, the list display unit 112 enlarges the list display area 242 and, at the same time, scrolls the category list upward.

Figure 8A:
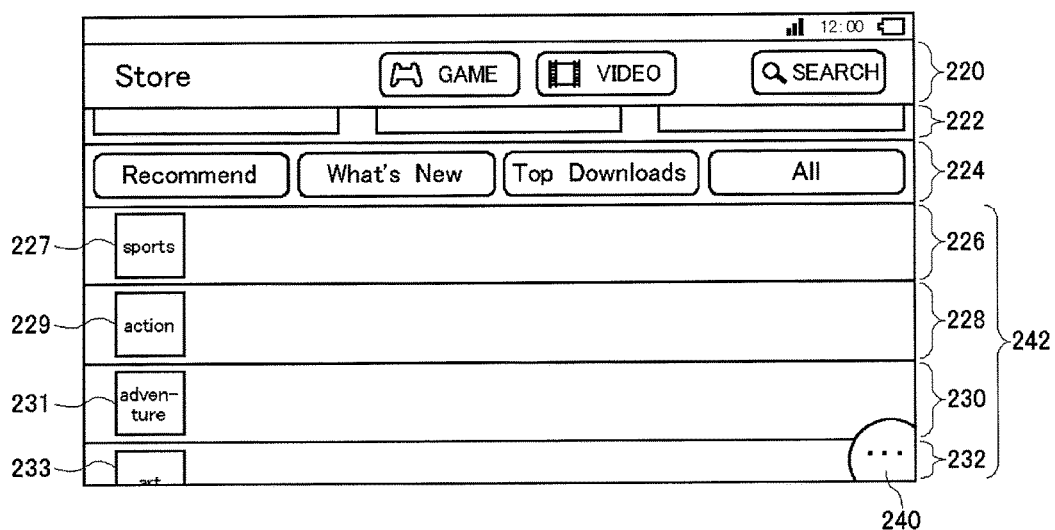
FIG. 8A and FIG. 8B each illustrates a screen while the top screen is being scrolled.
Figure 8B:
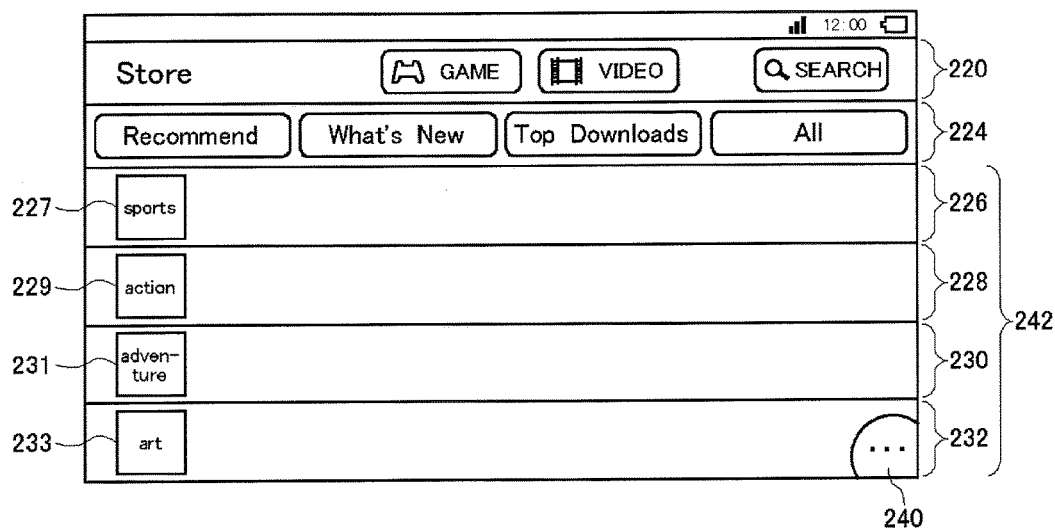

FIG. 8A illustrates a screen while the top screen is being scrolled. As the list display unit 112 receives the upward scroll instruction, the content display area 222 is erased upward from the state as shown in FIG. 7 and, at the same time, a new category display area 232 is displayed from below. FIG. 8B illustrates a screen where the content display area 222 has be completely erased. As a result of the complete erasure of the content display area 222, the list display area 242 is formed by four category display areas 226, 228, 230 and 232, and four category images 227, 229, 231 and 233 are displayed there, respectively. In this manner, when the category list is scrolled, the content display area 222 that is not to be scrolled (it means that the content display area 222 is not included in the category list) is erased and, instead, the category display area 232 is generated, so that the number of category images displayed can be increased. Even though the category list is further scrolled upward from the state as shown in FIG. 8B, the tab display areas 220 and 224 continue to be displayed intact there and therefore the category list is scrolled within the list display area 242 that display the four category images.

As some tabs by which to switch the screen are formed in each of the tab display areas 220 and 224, and the tab display areas 220 and 224 are preferably left intact in the screen of the display device 68 even while the screen is being scrolled. On the other hand, when the category list is scrolled, it is highly improbable that the user will use the content display area 222. Thus it will be meaningful that the content display area 222 is erased from the displayed screen and thereby the number of category images contained in the category list is increased. Hence, while the category list is being scrolled, the content display area 222 that is not to be scrolled is erased and thereby more categorical options for the user to choose from are available.

With a user's tap on a category image or category display area included in the list display area 242, the receiving unit 102 will acquire a selection instruction to select one from items (category images or category display areas) arranged adjacent to each other. At this time, the list display unit 112 displays a plurality of items, including a selected item, which are arranged adjacent to each other, and simultaneously displays an item associated with the selected item.

More specifically, as the receiving unit 102 acquires the selection instruction to select a category included in the category list, the list display unit 112 receives the selection instruction of a category, then displays the category images, contained in the category list, which are arranged adjacent to each other, and simultaneously displays a content list associated with the selected category image. A description is given hereunder of an example where the category image 229 is tapped on the top screen and the receiving unit 102 acquires a selection instruction to select the category of action game.

Figure 9:
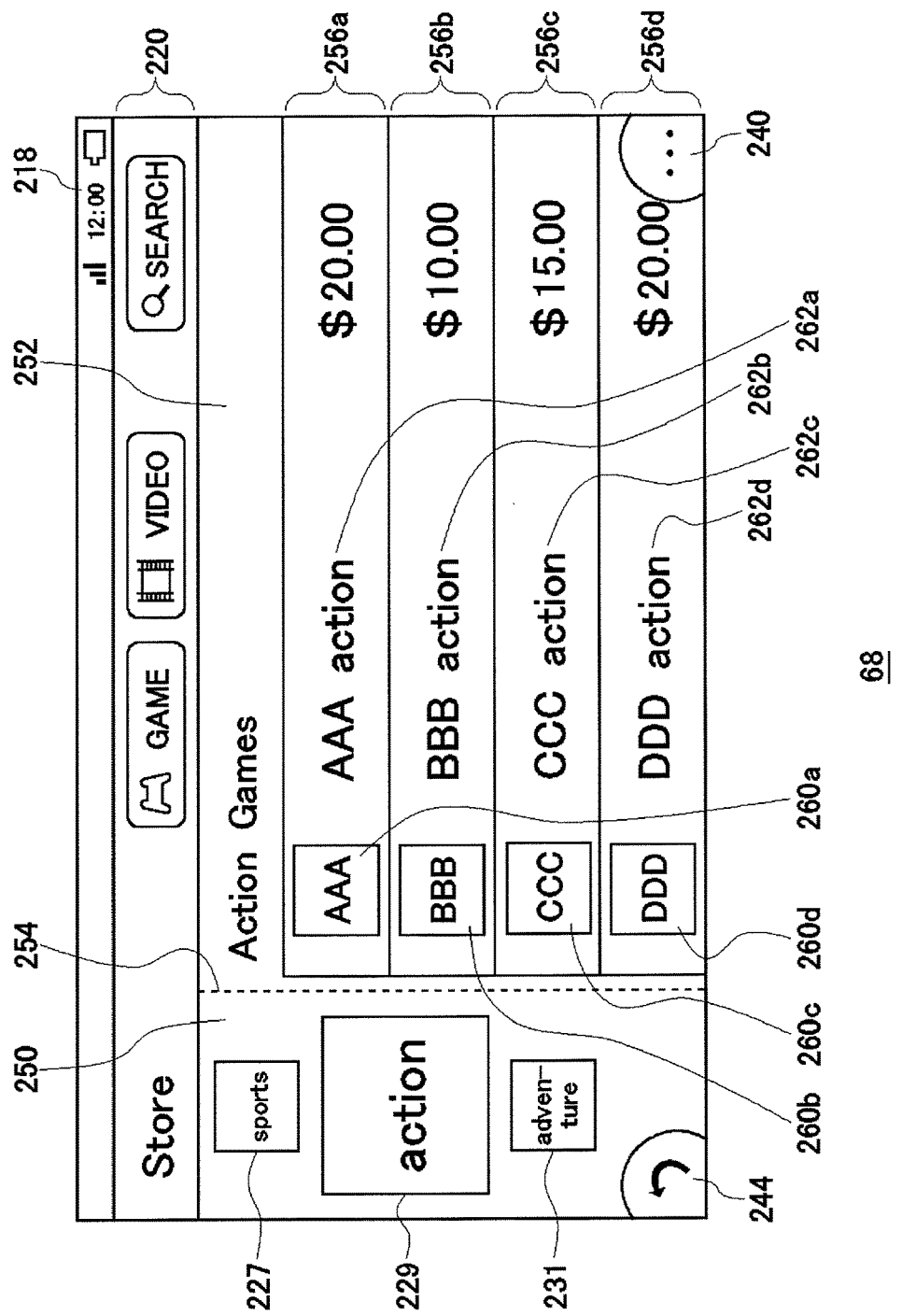
FIG. 9 illustrates a display screen of a content list.

FIG. 9 illustrates a display screen of a content list. As the receiving unit 102 receives the instruction to select the category of action game, the list display unit 112 divides the display area of the display device 68 into two parts. As shown in FIG. 9, since the information bar 218 and the tab display area 220 are constantly displayed in the display screen of the content list, the list display unit 112 divides a display area below them into left and right parts which are a first area 250 and a second area 252, respectively. Though a boundary line 254 is indicated as a dotted line in FIG. 9 to show the boundary between the first area 250 and the second area 252, the boundary line 254 needs not to be displayed in the actual screen.

The list display unit 112 causes a display of the items displayed on a previous display screen (top screen), namely a display screen immediately before the current display screen, in the leftmost first area 250. The items displayed in the first area 250 include at least an item selected on the previous screen. In this example, the category image 229 of action game is selected on the top screen and therefore the list display unit 112 displays at least the category image 229 in the first area 250. Though the list display unit 112 does not need to display all of the category images displayed on the previous screen, the list display unit 112 preferably displays the category images 227 and 231 adjacent to the category image 229. The user can scroll the category list by performing an up-down sliding action in the first area 250.

At the same time, the list display unit 112 causes a display of a content list of action game in the content display area of the second area 252. The list display unit 112 acquires content images 260 and content information 262 used for a display by referencing the list data of action game recorded in the recording medium 80 and then displays them in the second area 252. In this example, a content image 260a and content information 262a of "AAA action" game are displayed in the content display area 256a. Similarly, a content image 260b and content information 262b of "BBB action" game are displayed in a content display area 256b. Also, a content image 260c and content information 262c of "CCC action" game are displayed in a content display area 256c. And a content image 260d and content information 262d of "DDD action" game are displayed in a content display area 256d. In the second area 252, the user can scroll the content list, where a plurality of content images 260 are placed adjacent to each other, by performing an up-down sliding action.

In the first area 250, the selected category image 229 is displayed in such a manner that the selected category image 229 is larger than the other category images 227 and 231 placed adjacent to each other. This allows the user to easily verify which category is being selected. Note here that the selected category image 229 is placed in an approximately central part along a longitudinal direction in the first area 250. This approximately central part is called a focus area, so that placing a category image in the focus area results in the selection of said category image. Thus, if an arbitrary category image is placed in the focus area after the user scrolls the category list in the first area 250, a category associated with the category image placed in the focus area will be selected and the list display unit 112 will cause a display of a content list of the category associated therewith in the second area 252. Note that selection of a category can also be made by a user's tap on the category image in the first area 250. For example, in FIG. 9, a tap on the category image 227 by the user moves the category image 227 automatically to the focus area and then list display unit 112 causes a display of the content list of sport game in the second area 252.

As described above, after a transition of the display screen, the list display unit 112 displays an arrangement of a plurality of items that include at least the item selected on the previous screen (i.e., the item that has triggered the transition of the display screen). Hence, the user can repeat the selection on the previous screen without returning to the previous screen. The download application according to the exemplary embodiment implements a hierarchical structure where when a certain category is selected, a content list belonging to that category is displayed. Let us now explain this in terms of the hierarchical structure. When a transition is made from one hierarchy to another, the category list displayed in a higher hierarchy than the current hierarchy by one level is displayed on the left side. Thereby, the category can be changed without returning to said hierarchy, and the displaying of content lists can be switched.

The button generator 116 generates a return button 244 in a lower-left corner of the display. The return button 244 is a GUI used to return to the previous screen; with a tap on the return button 244 by the user, the screen can return to a display screen immediately before the current display screen. The list display unit 112 according to the present exemplary embodiment causes a display of the list displayed on the previous screen on the leftmost area. However, as shown in FIG. 9, the first area 250 has a narrow space for a display and only the category images are displayed in the firs area 250. Thus, when the user wishes to view the detail of the previous screen, he/she only has to tap on the return button 244. Since the top screen has no previous screen to return to, the return button 244 is not displayed on the top screen.

The button generator 116 produces both the return button 244 and the option button 240 in the lower corners of the display. The electronic device 10 has a horizontally-long casing, and the user often holds the casing at the left and right sides thereof with both of his/her hands. Accordingly, the user often operates the touch panel 69 with the thumbs of both hands. It was therefore found out by the present inventors that if the return button 244 and the option button 240 are placed at upper positions of the display, it would be difficult to operate these buttons. As a result thereof, the button generator 116 always places the return button 244 and the option button 240 in lower corners, thereby enhancing the operability thereof by the thumbs and placing them out of the way of the other items being displayed. Placing the return button 244 and the option button 240 constantly in the lower corners means that they are placed constantly in the lower corners even when the list is scrolled in the first area 250 and the second area 250. Placing the buttons in the corners only is advantageous in that the space for a display can be efficiently utilized as compared with the case where the buttons are placed on a tool bar or the like.

With a user's tap on any of the content images 260 (or any of the content display areas 256) on the display screen of a content list, the receiving unit 102 acquires a selection instruction to select one from items arranged adjacent to each other. At this time, the list display unit 112 causes a display of a plurality of items, including a selected item, which are arranged adjacent to each other, and simultaneously displays an item associated with the selected item.

More specifically, as the receiving unit 102 acquires the selection instruction to select a content included in the content list, the list display unit 112 receives the selection instruction of a content, then displays the content images 260, contained in the content list, which are arranged adjacent to each other. Also, the detail information display unit 114 receives the selection instruction of the content and displays the detailed information of the content associated with the selected content image 260. A description is given hereunder of an example where the content image 260b is tapped on the display screen of the content list shown in FIG. 9 and then the receiving unit 102 acquires the selection instruction to select the "BBB action" game.

FIG. 10 illustrates a display screen of detailed information on a content. As the receiving unit 102 acquires the instruction to select the BBB action game, the list display unit 112 divides the display area of the display device 68 into three parts. As shown in FIG. 10, since the tab display area 220 is constantly displayed, the list display unit 112 divides a display area below the tab display area 220 into left, middle and right parts which are a first area 270, a second area 272, and a third area 274, respectively.

The list display unit 112 causes a display of the items displayed in a previous display screen, namely a display screen immediately before the current display screen, in the leftmost first area 270. The items displayed in the first area 270 include at least an item selected on the previous screen. In this example, the content image 260b is selected on a content list display screen and therefore the list display unit 112 displays at least the content list 260b in the first area 270. Though the list display unit 112 does not need to display all of the content images displayed on the previous screen, the list display unit 112 preferably displays the content images 260a and 260c adjacent to the content image 260b. The user can scroll the content list by performing an up-down sliding action in the first area 270.

The detail information display unit 114 causes a display of detailed information 280 of the selected BBB action game. The detail information display unit 114 acquires the detailed information 280 of the BBB action game from the recording medium 80 and causes its display in the second area 272. A purchase button 282 is displayed in the second area 272; with a tap on the purchase button 282 by the user, a purchase screen of the content will be generated.

In the first area 270, the selected content image 260b is displayed in such a manner that the selected content image 260b is larger than the other content images 260a and 260c placed adjacent to each other. This allows the user to easily verify which content is being selected. Note here that the selected content image 260b is placed in an approximately central part along a longitudinal direction in the first area 270. As described in conjunction with FIG. 9, this approximately central part is called the focus area, so that placing a content image in the focus area results in the selection of said content image. Thus, if an arbitrary content image is placed in the focus area after the user scrolls the content list in the first area 270, a content associated with the content image placed in the focus area will be selected and the detail information display unit 114 will cause a display of the detailed information 280 of the content in the second area 272. Note that selection of a content can also be made by a user's tap on the content image in the first area 270. For example, in FIG. 10, a tap on the content image 260a by the user moves the content image 260a automatically to the focus area and then the detail information display unit 114 will cause a display of the detailed information 280 of AAA action game in the second area 272.

Thus, after a transition of the display screen, the list display unit 112 displays an arrangement of a plurality of items that include at least the item selected on the previous screen. Hence, the user can repeat the selection on the previous screen without returning to the previous screen.

The list display unit 112 causes a display of a content list related to the selected BBB action game in the rightmost third area 274. Displayed in the third area 274 is a content list of content images 284a to 284c of the games that have been purchased by persons who purchased the BBB action game in the past. Therefore, if there is a change in the content image placed in the focus area in the first area 270, the list display unit 112 reads out a content list associated with the selected content image from the recording medium 80 and causes its display in the third area 274.

Note that, with a user's tap on a content image 284 in the third area 274, the list display unit 112 will place the content image in the focus area in the first area 270, and the detail information display unit 114 will cause a display of detailed information of the content image in the second area 272. Also, the list display unit 112 causes a display of a content list associated with the selected content image in the third area 274. Note also that the same processings will take place when a content image 223 is tapped on the top screen of FIG. 7.

At this time, the list display unit 112 causes a display of the content images, which have been displayed above and below the content image when the content image was selected, above and below the focus area in the first area 270. For example, in FIG. 10, when the content image 284b is tapped, the list display unit 112 places the content image 284b in the focus area in the first area 270 and places the content image 284a above the focus area and the content image 284c below the focus area. Also, in FIG. 7, when the content image 223b is tapped, the list display unit 112 places the content image 223b in the focus area in the first area 270 and places the content image 223a above the focus area and the content image 223c below the focus area. In this manner, the content list at the time of a content image selection can be left unerased even after a change of the screen.

It should be appreciated that a content list to which the selected content image belongs may be displayed in front and in back of the focus area. Also, the arrangement may be such that no content list is displayed in front and in back of the focus area.

Figure 11:
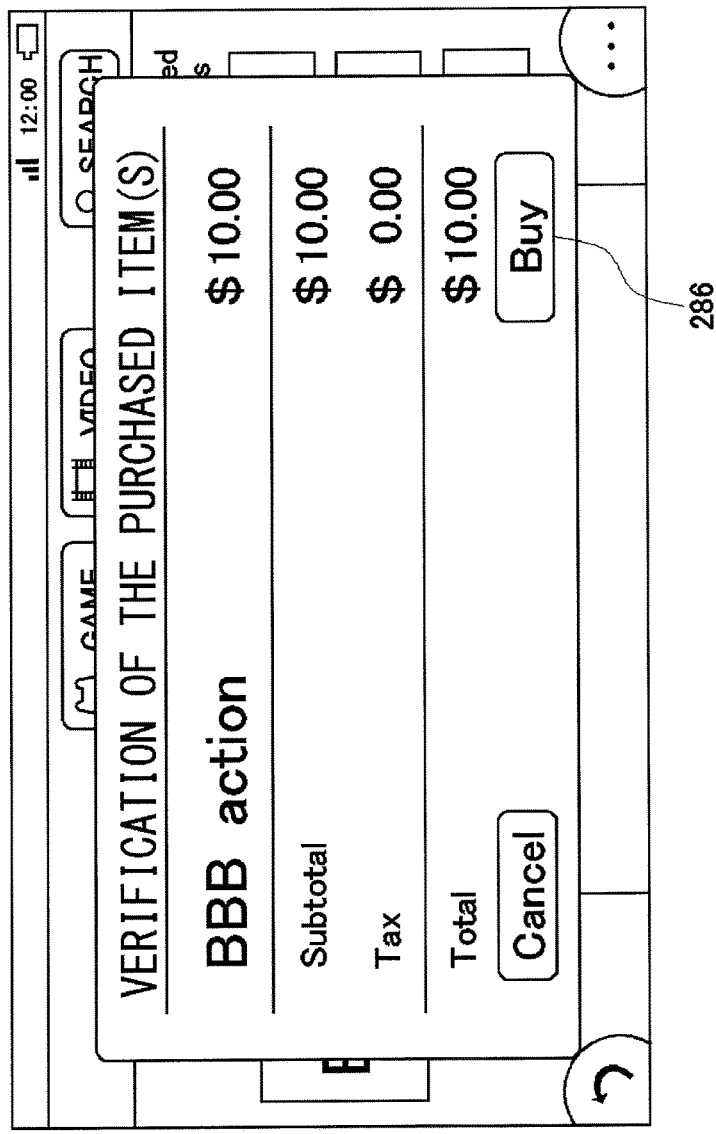
FIG. 11 illustrates a content purchase screen.

FIG. 11 illustrates a content purchase screen. As the receiving unit 102 receives a selection instruction by the purchase button 282, the purchase screen generator 118 generates a purchase screen and causes a superimposed display of it on the detailed information display screen. With a tap on the purchase button 286 by the user, the transmitting unit 140 will send purchase information to the content distribution server 4, and the purchase of the content will be completed upon the end of a charging process by the content distribution server 4.

Figure 12:
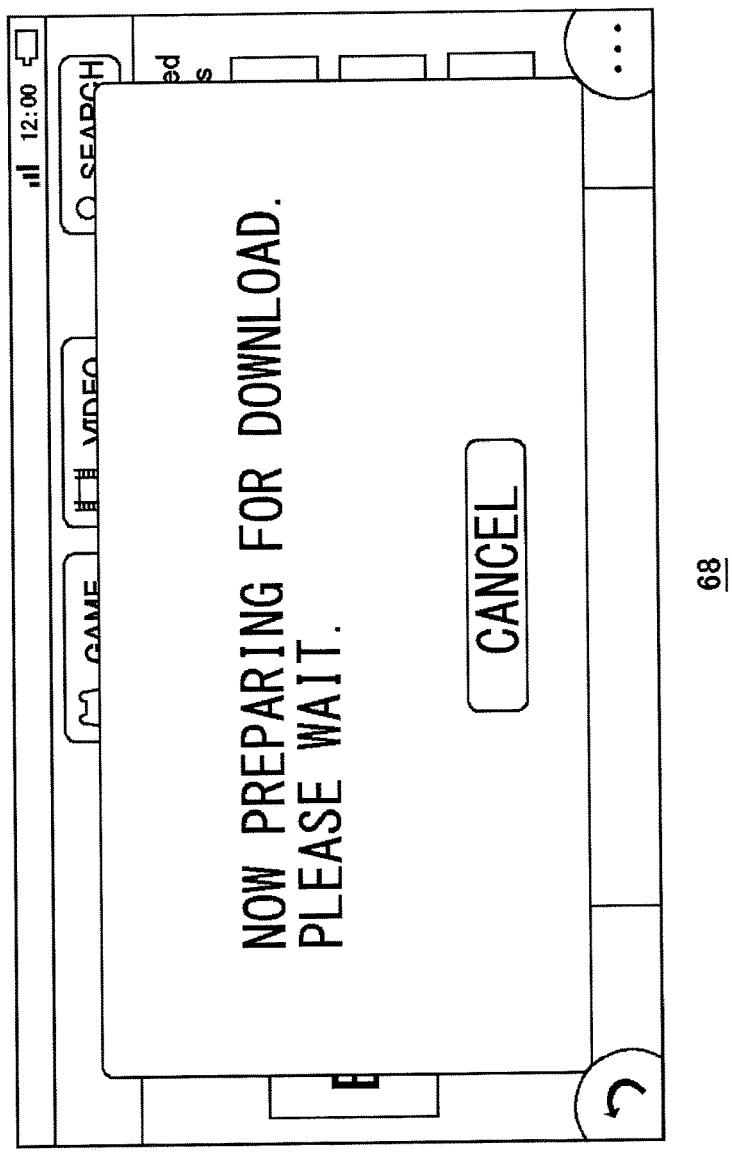
FIG. 12 illustrates a download standby screen.

FIG. 12 illustrates a download standby screen. Upon the end of account processing by the content distribution server 4, the electronic device 10 goes into a standby for the downloading of the purchased content file. The standby screen generator 120 generates a download standby screen and causes a superimposed display of it on the detailed information display screen. With the completion of transmission readiness, the standby screen generator 120 ends the display of the standby screen.

In the present exemplary embodiment, the download execution unit 150 downloads the content file in the background. The downloading in the background enables the user to operate the electronic device 10 even during the downloading of a content file. However, this may pose a problem that the user cannot readily see the progress of the downloading that is being done in the background.

Thus, as the download execution unit 150 starts the downloading of a content file with the completion of a download standby, a special rendering to inform the user of the start of downloading is executed for the user.

Figure 13:
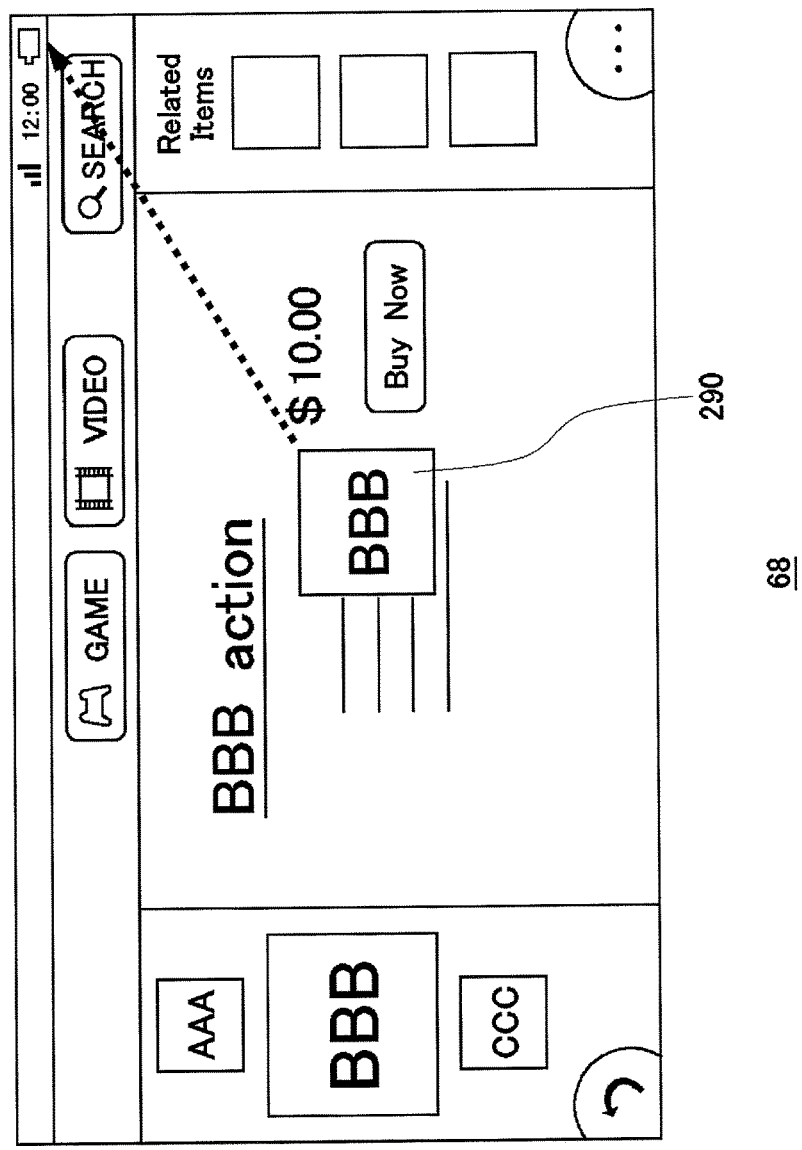
FIG. 13 is an illustration for explaining a special rendering.

FIG. 13 is an illustration for explaining a special rendering. The special rendering display unit 122 executes a special rendering of informing the user of the start of downloading. Referring back to FIG. 6, the user can check the progress of downloading by tapping on the indicator 210 in the upper-right corner of the board screen. The indicator control unit 126 causes a display of the indicator 210 in the upper-right corner of the board screen as shown in FIG. 6. Although a description is given here of the indicator 210 as the button for a display of a download progress check screen, the indicator 210 is also the button for a display of a notification screen of status changes of applications as already described.

On the screen shown in FIG. 13, there is no indicator 210 being displayed. Hence, the special rendering display unit 122 executes a special rendering of impressing the position of the indicator 210 on the board screen shown in FIG. 6 on the user. More specifically, the special rendering display unit 122 causes a shift of a specific image to the position where the indicator 210 is to be displayed (the upper-right corner here). This specific image may be a content image 290 of the content file to be downloaded as shown in FIG. 13. The special rendering display unit 122 first causes a display of the content image 290 in the center of the screen and then causes it to be drawn and sucked into the upper-right corner of the screen as it gets smaller and smaller. Thus, this special rendering aims to facilitate the user's finding the indicator 210 when the board screen is displayed; this is efficiently done because the user retains the impression of the content image 290 sucked into the upper-right corner when there was no display of the indicator 210 on the screen as shown in FIG. 13. Also, a special rendering of displaying a temporary indicator image in the upper-right corner of the screen and getting the content image 290 sucked into the temporary indicator image is executed as the content image 290 moves toward the top right; this allows the user to be impressed with the presence of the indicator 210.

In this special rendering, the starting position (initial display position) of the content image 290 is not limited to the center of the screen, but the starting position may be a position other than the center thereof. Also, the special rendering may be such that the content image 260b shown in FIG. 10 moves to the position where the indicator is to be displayed. In doing so, the content image 260b displayed in the first area 270 may remain unerased in the position and its copy may move to the position where the indicator is to be displayed. In the present exemplary embodiment, the indicator control unit 126 causes a display of the indicator 210 in the upper-right corner of the board screen, but it is not necessary that the display position of the indicator 210 is fixed there. In this case, the special rendering display unit 122 may contact the indicator control unit 126 for the display position of the indicator 210 and may execute a special rendering of moving the content image 290 to the position. As the special rendering by the special rendering display unit 122 comes to an end, the guide screen generator 124 causes a display of a guide screen or guidance screen about the progress of downloading.

Figure 14:
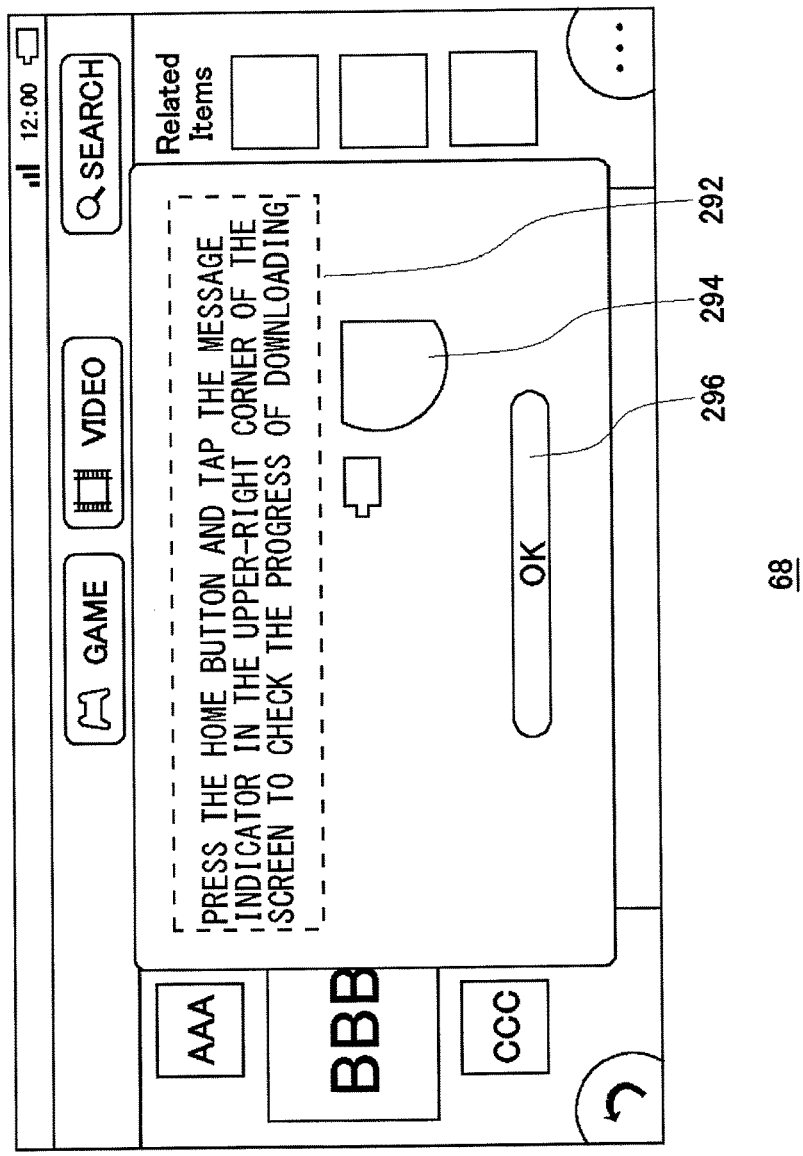
FIG. 14 illustrates a guide screen.

FIG. 14 illustrates a guide screen. The guide screen contains information concerning the indicator to be operated by the user when he/she checks the progress of downloading. More specifically, the guide screen generator 124 causes a display of operating information 292, an indicator image 294, and a check button 296 on the guide screen. The operating information 292 indicates a procedure to get a display of a progress check screen. By reading the operating information 292, the user learns that pressing the HOME button 26 and tapping on the indicator 210 will get the display of the download progress check screen.

The inventors have reached the design of this guide screen through trial and error. Ideally, the user can learn the display procedure of the download progress check screen by reading the operating information 292. However, this guide screen has been designed by the inventors taking into account the possibility that the user does not necessarily read the text of the operating information 292.

The guide screen generator 124 does not allow the automatic erasure of the guide screen by the presence of the check button 296. The guide screen generator 124 keeps the guide screen on until the user taps on the check button 296 and the receiving unit 102 receives a check confirmation. As a result, the guide screen provides an opportunity for the user to read the operating information 292 when he/she taps the button. Thus the user can close the guide screen upon comprehending the necessary procedure. As the receiving unit 102 receives the check confirmation, the guide screen generator 124 ends the display of the guide screen. In this manner, the forced tapping to close the guide screen can draw the user's attention to the operating information 292.

It is to be noted that the operating information 292, which is a text message, requires the user to read it. Further, to promote the user's better understanding of the display procedure, the guide screen generator 124 presents the indicator image 294 to show the display mode of the indicator 210 on the board screen. While the indicator image 294 represents the image of the indicator 210, showing a battery image, which is actually located on the left of the indicator 210 on the board screen, on the left of the indicator image 294 will help the user learn of the display mode of the indicator 210 on the board screen better. In combination with the special rendering by the special rendering display unit 122, the guide screen generated by the guide screen generator 124 further helps the user comprehend the display procedure of the download progress check screen.

Also, the arrangement may be such that the guide screen generator 124 generates this guidance screen only when the user downloads a content file for the first time. Since there is no need for repeated guidance once the user learns the display procedure, the guide screen generator 124 causes a display of the guidance screen for the initial downloading only. In other words, the guide screen of this exemplary embodiment is of such design that the user can gain a complete understanding from a single viewing of the guidance.

Figure 15:
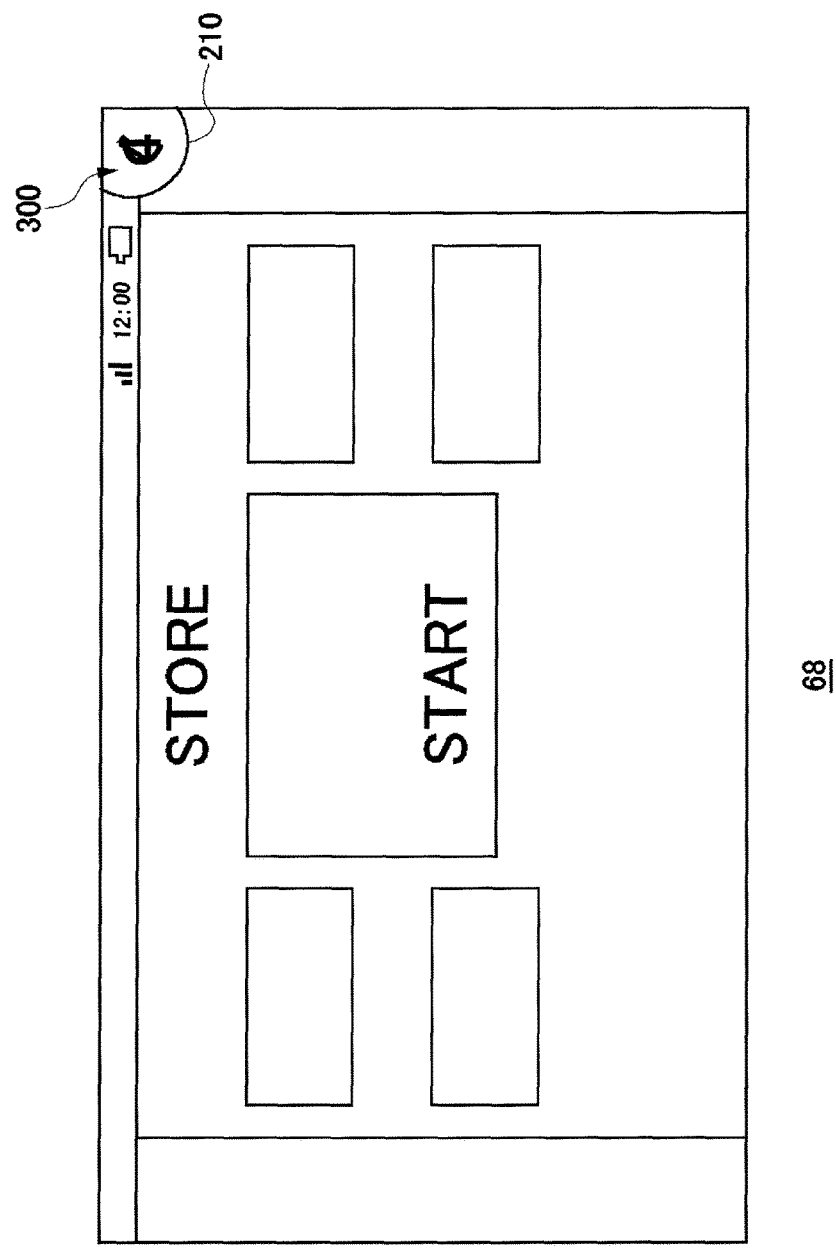
FIG. 15 illustrates a board screen.

As the user presses the HOME button 26 after tapping the check button 296, the board screen generator 128 causes a display of a board screen. FIG. 15 illustrates a board screen. During the downloading of a content file, the indicator control unit 126 effects a special rendering within the display area of the indicator 210 to inform the user of the progress of downloading, such as the swirling of a pattern 300. As described above, the numeral appearing in the display area of the indicator 210 does not get incremented by the start of downloading of a content file. It gets incremented only when the downloading is completed. Thus, the user is informed of the progress of a downloading by a special rendering, such as the swirling of a pattern, during the downloading. In this manner, the user can recognize the progress of downloading.

Figure 16:
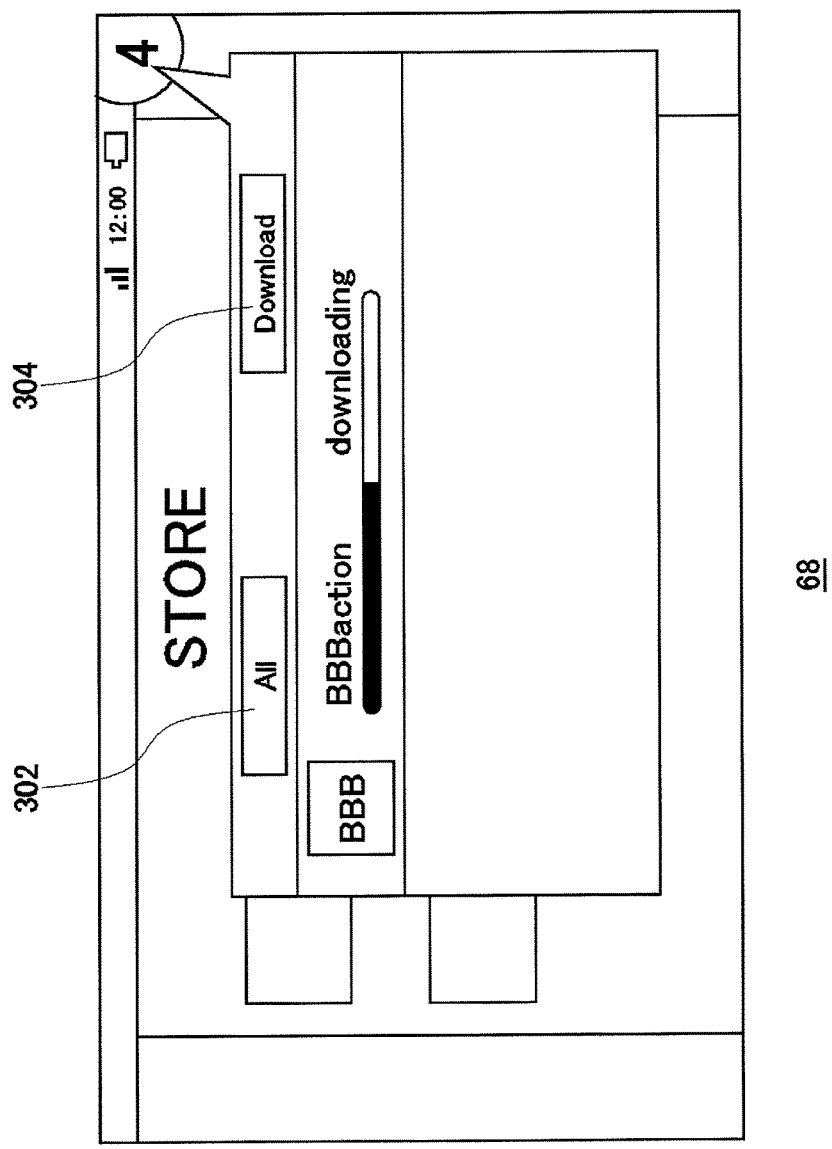
FIG. 16 illustrates a download progress check screen.

With a tap on the indicator 210 by the user, the receiving unit 102 will receive the selection instruction of the indicator 210, and the indicator control unit 126 will cause a display of the download progress check screen as shown in FIG. 16 on the board screen. Note that, on this screen, a progress check screen as shown in FIG. 16 will be displayed when a tab 304 is selected, and a notification screen of status changes including information from four different applications will be displayed when a tab 302 is selected. On the progress check screen, the user can check the progress of downloading in the background by viewing a progress bar.

The present invention has been described based upon illustrative exemplary embodiments. The above-described exemplary embodiments are intended to be illustrative only and it will be obvious to those skilled in the art that various modifications to the combination of constituting elements and processes could be developed and that such modifications are also within the scope of the present invention.

For example, the indicator 210 may be displayed on the screens provided by the download application as illustrated in FIGS. 7 to 14. In such a case, the special rendering as explained in conjunction with FIG. 13 may be a method where the content image 290 is sucked into the indicator 210 being actually displayed. Also, the operating information 292 shown in FIG. 14 may be replaced by "Please tap a message indicator in the upper-right corner of the screen to check the progress of downloading".

What is claimed is:

1. An electronic device comprising:
   an acquisition unit configured to acquire data of an item of content; and
   a display control unit configured to generate an image displayed on a display,
   the display control unit including:
     a display processing unit configured to place a plurality of categories in a single column adjacent to each other in a first direction; and
     a receiving unit configured to acquire a first selection instruction by which to select a category from the plurality of categories,
       wherein, when the receiving unit acquires the first selection instruction, the display processing unit places the plurality of categories, including the selected category, adjacent to each other so as to be displayed in a first column and simultaneously displays a plurality of items belonging to the category in a second column adjacent the first column,
   wherein the plurality of categories and the plurality of items are separately scrollable while concurrently maintaining the simultaneous display of the plurality of categories in the first column and the plurality of items in the second column;
   wherein, when the receiving unit acquires a second selection instruction for selecting an item from the plurality of items displayed in the second column, the plurality of items are moved to the first column, detailed information about the selected item are displayed in the second column occupying an entirety of the second column, and a plurality of related items are placed in a third column adjacent to the second column, the plurality of related items being of a same type as the selected item, and
   wherein, if any of the plurality of items displayed in the first column other than the selected item is selected by a user while the first column and second column are still concurrently displayed, the newly selected item is moved to a center of the first column and a detailed information display screen related to the newly selected item is displayed in the center column.

2. An electronic device according to claim 1, wherein the display processing unit displays the selected item in such a manner that the selected item is larger than the other items placed adjacent to each other.

3. An electronic device according to claim 1, wherein the display processing unit displays a return button, with which to return to a previous display screen, in a lower corner of the display.

4. An electronic device according to claim 1, wherein, when a screen where scrolling a plurality of display areas are formed, the display processing unit enlarges an area where the screen is scrolled in such a manner that a predetermined display area where the screen is not scrolled is erased from the screen.

5. A program embedded in a non-transitory computer-readable medium, the program comprising:
an acquiring module operative to acquire data of an item of content; and
a display control module operative to generate an image displayed on a display, the display control module including:
a display processing module configured to place a plurality of categories in a single column adjacent to each other in a first direction; and
a receiving module configured to acquire a first selection instruction by which to select a category from the plurality of categories,
wherein, when the receiving module acquires the first selection instruction, the display processing module places the plurality of categories, including the selected category, adjacent to each other so as to be displayed in a first column and simultaneously displays a plurality of items belonging to the category in a second column adjacent the first column,
wherein the plurality of categories and the plurality of items are separately scrollable while concurrently maintaining the simultaneous display of the plurality of categories in the first column and the plurality of items in the second column;
wherein, when the receiving module acquires a second selection instruction for selecting an item from the plurality of items displayed in the second column, the plurality of items are moved to the first column, detailed information about the selected item is displayed in the second column occupying an entirety of the second column, and a plurality of related items are placed in a third column adjacent to the second column, the plurality of related items being of a same type as the selected item, and
wherein, if any of the plurality of items displayed in the first column other than the selected item is selected by a user while the first column and second column are still concurrently displayed, the newly selected item is moved to a center of the first column and a detailed information display screen related to the newly selected item is displayed in the center column.

6. A non-transitory computer-readable medium encoded with a program, executable by a computer, according to claim 5.

* * * * *